United States Patent
Larsen (10) Patent No.: US 9,546,048 B2
(45) Date of Patent: Jan. 17, 2017

(54) DRUM DISPENSER

(71) Applicant: Simatek Bulk Systems A/S, Høng (DK)

(72) Inventor: Torben Drost Larsen, Gørlev (DK)

(73) Assignee: Simatek Bulk Systems A/S, Høng (DK)

( * ) Notice: Subject to any disclaimer, the term of this patent is extended or adjusted under 35 U.S.C. 154(b) by 238 days.

(21) Appl. No.: 14/155,826

(22) Filed: Jan. 15, 2014

(65) Prior Publication Data
US 2015/0197358 A1 Jul. 16, 2015

(51) Int. Cl.
| | |
|---|---|
| B65B 43/52 | (2006.01) |
| B65B 1/36 | (2006.01) |
| B65B 1/06 | (2006.01) |
| B65G 29/02 | (2006.01) |
| B65G 17/36 | (2006.01) |
| B65G 47/18 | (2006.01) |

(52) U.S. Cl.
CPC ............. B65G 29/02 (2013.01); B65G 17/36 (2013.01); B65G 47/18 (2013.01)

(58) Field of Classification Search
CPC .......... B65G 17/36; B65G 29/02; B65G 47/18
USPC .... 141/1, 129, 130, 131, 144, 154, 174, 183
See application file for complete search history.

(56) References Cited

U.S. PATENT DOCUMENTS

| | | | | |
|---|---|---|---|---|
| 503,029 A | * | 8/1893 | Baker ....................... | B65B 3/32 100/223 |
| 3,529,870 A | * | 9/1970 | Woten ..................... | E04F 21/12 406/135 |
| 3,570,557 A | * | 3/1971 | Molins ................. | A24D 3/0225 118/308 |
| 3,913,634 A | * | 10/1975 | Eisenberg ............. | B65B 31/025 141/129 |
| 4,005,668 A | * | 2/1977 | Washington ......... | A24D 3/0225 141/129 |
| 4,111,493 A | * | 9/1978 | Sperber ................. | D01G 23/00 198/532 |
| 4,340,096 A | * | 7/1982 | Stoddard ............... | B65G 47/58 141/1 |

(Continued)

FOREIGN PATENT DOCUMENTS

| | | |
|---|---|---|
| DE | 218608 | 2/1910 |
| DE | 3332861 | 3/1985 |

(Continued)

*Primary Examiner* — Timothy L Maust
*Assistant Examiner* — Andrew Schmid
(74) *Attorney, Agent, or Firm* — James Creighton Wray; Meera P. Narasimhan (57) ABSTRACT

For filling cups in a cup conveyor, the cups are interconnected and arranged juxtaposed and thus constitute an endless conveyor belt. A cup at least includes an upwardly facing opening. The apparatus includes a filling station with an adjustable dosing device from which the material is supplied to the cups via a chute system during their passage of the filling station. A new feature of an apparatus and a method according to the invention is that the filling station of the apparatus includes a rotatable dispenser arranged above the cups. The rotatable dispenser includes at least one dosing aperture for dosing material into a cup. The apparatus further includes drive means and means for controlling and regulating the at least one dosing aperture in the rotatable dispenser in relation to the positions of the openings in adjacent cups at the filling station when the apparatus is in operation.

14 Claims, 11 Drawing Sheets

(56) References Cited

U.S. PATENT DOCUMENTS

| | | | | |
|---|---|---|---|---|
| 4,429,806 A | * | 2/1984 | Schwarzli | B65G 59/066 221/20 |
| 4,509,568 A | * | 4/1985 | Kawaguchi | B65B 1/00 141/129 |
| 4,978,252 A | * | 12/1990 | Sperber | B65G 53/4633 198/532 |
| 5,320,146 A | * | 6/1994 | Stevie | B65B 1/363 141/1 |
| 5,826,633 A | * | 10/1998 | Parks | B65B 9/042 141/125 |
| 5,924,969 A | * | 7/1999 | Waluda | B29C 31/068 493/374 |
| 6,131,622 A | * | 10/2000 | Fritze | G07F 13/04 141/129 |
| 6,182,712 B1 | * | 2/2001 | Stout | A61J 3/02 141/125 |
| 6,796,457 B2 | * | 9/2004 | Sperber | B65D 88/68 222/1 |
| 7,083,069 B2 | * | 8/2006 | Wysong | A01C 7/126 222/129 |
| 7,938,348 B2 | * | 5/2011 | Evans | B02C 18/2216 241/225 |
| 7,971,813 B2 | * | 7/2011 | O'Leary | B02C 18/2216 241/18 |
| 7,971,814 B2 | * | 7/2011 | Evans | B02C 23/30 241/60 |
| 9,073,711 B2 | * | 7/2015 | Savarese | B65G 65/4881 |
| 2007/0284012 A1 | * | 12/2007 | Smith | A24D 3/0225 141/1 |
| 2013/0118638 A1 | * | 5/2013 | Hopkins | A61J 3/074 141/1 |
| 2015/0197358 A1 | * | 7/2015 | Larsen | B65G 17/36 141/1 |

FOREIGN PATENT DOCUMENTS

| | | |
|---|---|---|
| EP | 0225775 | 6/1987 |
| GB | 663493 | 12/1951 |
| GB | 2205547 | 12/1988 |
| JP | 61263528 | 12/1986 |
| JP | H0338465 | 2/1991 |
| JP | 4848388 | 12/2011 |

* cited by examiner

DRUM DISPENSER

FIELD OF THE INVENTION

The present invention concerns a cup conveyor including an apparatus for filling cups in a cup conveyor, wherein the cups are interconnected and arranged juxtaposed and thus constitute an endless conveyor belt, wherein a cup at least includes an upwardly facing opening, two opposing end faces and one or more bottom faces and/or side faces, wherein in the direction of movement of the conveyor belt along the extension of the cup the opening has a leading edge and a trailing edge extending transversely to the direction of movement of the conveyor belt, which is typically substantially horizontal during filling of the cups, wherein the apparatus further includes a filling station with an adjustable dosing device from which the material is supplied to the cups via a chute system during their passage of the filling station. The invention furthermore concerns a method for using an apparatus, wherein the method includes filling cups of a cup conveyor, wherein at conveyor belt moves in a direction of movement at a given speed, wherein a dosing device at a filling station doses a matching flow of material.

BACKGROUND OF THE INVENTION

When conveying loose material such as e.g. granulate, animal feed, cereals and similar it is very common to use so-called cup conveyors. The cups, which are typically made of a suitable type of plastic, are moved in an endless path between a filling station and an emptying station, and are distinguished by being pivotably suspended about a horizontal axis so that they always have the opening facing upwards. Filling of such cups are typically effected by letting the cups pass under a filling station with a chute and a dosing device. The dosed material slides down the chute in a continuous flow and down into the cup. The amount of dosed material is typically controlled by a damper or other suitable regulating mechanism in the dosing device. The degree of filling of individual cups is controlled by how much material is dosed per time unit compared with how fast the cups pass the filling station. In order to achieve optimal utilisation of such a cup conveyor it is desirable that the cups are filled sufficiently during the passage of the filling station. The speed at which the cups pass the filling station and the amount of the dosed material per time unit can be adjusted so that optimal filling of the cups is achieved while at the same time the desired amount of material is moved.

This form of filling, however, implies a problem as the material tends to accumulate at the trailing edge of the cup as seen in the direction of movement. This accumulation causes the cup to be unbalanced and possibly overturn at the subsequent vertical transport. Another problem is that the filling degree of the cups is reduced hereby. By low filling degree the system has to run more (i.e. for a longer time) or faster than if the filling degree is high, causing more wear and thus more maintenance on the system as such.

As the material is supplied to the cups in a continuous stream and in order to avoid spilling between the cups during filling, it is normal that the cups have an overlap at both ends. The overlapping parts of adjacent cups lie above and below each other, respectively. This overlapping, however, introduces some problems. Typically, some of the material will settle upon this overlap and have a tendency of being squeezed between the overlapping parts of two cups, causing damage to the cups or crushing of the material which becomes unwanted dust. Furthermore, these overlapping parts give rise to problems when the cups are to change direction of movement, e.g. from horizontal to vertical. In such a situation it is required that the overlapping parts of respective cups are disposed correctly in relation to each other such that the cup will not overturn when changing conveying direction from horizontal to vertical, or vice versa. In the worst case a wrong disposition will result in breaking of a cup and that the facility has to be stopped for replacing the broken cup. In order to avoid or at least limit these problems, such facilities are equipped with shifters which can determine which of the overlapping ends of the cups are to be at the top. If this overlap by the cups can be dispensed with, the mentioned shifters can be obviated in the system, and there will be a marked reduction in wear on the cups as they no longer need to be in direct mutual contact. By obviating overlapping between the cups and thereby also the shifters, such a system would be cheaper as well as more reliable.

Examples of rotary dispensers, e.g. for use with cup conveyors are disclosed in JP 61-263528 A, JP H03-038465 A, DE 3332861 A1 and GB 663493 A.

From DE 218608 is known a system wherein the cups are arranged without overlapping and where the material is supplied to a rotating lock wherein the material is fed to a compartment at the periphery of this lock and which is subsequently rotated and gradually emptied according to the rotation. The material is first measured—supplied to the compartment in the lock—and subsequently emptied into the cup. As the lock is rotated, the material is "dumped" and falls down into the cup in an uncontrolled stream. By this emptying which starts well above the upwardly facing opening of the cup and which is only finished after rotating at least 90°, there is a great risk that material from an overfilled compartment falls beside the cup. Moreover, this can be both dusty and damaging, rough treatment of the material. This is due to the design as the material is not conducted via any kind of chutes or the like for the cup and actually released from the lock at a rather great height above the cup, a reason why the apparatus according to DE 218608 leaves something to be desired.

Furthermore, there is the fact that if increased capacity is wanted it is not possible immediately to increase the rotary speed of the lock and the conveying speed of the cups as this will entail that the material in the lock is almost thrown out of the latter. Hereby an even greater spillage or loss of material will arise.

A further drawback of the solution as indicated in DE 218608 is that the material dosed and supplied to the cups via the lock very easily may get pinched between the rotating lock and the area at which the material is accumulated in front of the lock. Some of the material is hereby unavoidably crushed hereby, causing waste, and in some cases crushed material is entirely unwanted, being decisive as to whether the material can be used or not. At the same time this fact also entails an unacceptably extensive wear on the machine parts in contact with the material when the latter is crushed. It is therefore a great disadvantage that the apparatus is arranged such that material is accumulated in front of the rotating lock.

In principle, DE 218608 indicates a solution wherein the material is measured in a compartment and supplied to a cup. Thus there is no possibility of increasing the capacity beyond a given amount per time unit which is determined by the size of the compartment and the rotary speed of the lock which is subject to certain limitations as described above.

OBJECT OF THE INVENTION

It is the object of the invention to indicate an apparatus which can fill the material into a continuously conveyed number of cups of a cup conveyor, wherein by the apparatus there is achieved a minimal spilling between cups, wherein the material is dosed carefully and precisely, and thus wherein there is no longer need for overlapping between two adjacent cups.

DESCRIPTION OF THE INVENTION

As mentioned in the introduction, the invention concerns a cup conveyor comprising an apparatus for filling of the cups wherein the cups are interconnected and arranged juxtaposed and thus constitute an endless conveyor belt, wherein a cup at least includes an upwardly facing opening, wherein the apparatus further includes a filling station with an adjustable dosing device from which the material is supplied to the cups via a chute system during their passage of the filling station.

The new features of an apparatus according to the invention are that the filling station of the apparatus includes a rotatable dispenser arranged above the cups, that means for supplying material are arranged at the centre of the rotatable dispenser, that the rotatable dispenser includes a rotary drum comprising at one dosing or more apertures for dosing material into a cup and a chute at each side of the one or more dosing apertures, and where the wall of the drum, or at least a part thereof forms a chute for the material between a dosing aperture and a subsequent dosing aperture, which chutes extends more or less down into a passing cup. The apparatus further includes drive means and means for controlling and regulating the at least one dosing aperture and the chutes in the rotatable dispenser in relation to the positions of the openings in adjacent cups and a trailing edge and a leading edge of two adjacent cups at the filling station, so that the chutes covers the gap existing between two cups in succession when the apparatus is in operation.

As also mentioned in the introduction, the invention furthermore concerns a method for using an apparatus, wherein the method includes filling cups of a cup conveyor, wherein at conveyor belt moves in a direction of movement at a given speed, wherein a dosing device at a filling station doses a matching flow of material.

The method according to the invention includes at least the following steps:
 cups connected with a conveyor belt are moved past a dosing device with a rotatable dispenser with at one or more dosing apertures;
 the rotatable dispenser is rotated concurrently with the position of the cups and so that the dosing aperture or each of the dosing apertures of the rotatable dispenser is always opposite an opening of a cup and so that a leading edge of one cup and the trailing edge of another, adjacent cup are covered by the chute system of the dosing device;
 material is dosed via a specific dosing aperture and supplied to a cup at a specific position.

By such an apparatus and such a method there is achieved a clear advantage by the way in which the material is conducted into respective cups on the conveyor. By using a rotating dispenser with one or more dosing apertures wherein the dosing apertures are controlled such that a dosing aperture more or less follows an opening in a passing cup, it is ensured that the material to be conveyed is conducted directly into a specific cup. In other words there is no longer a continuous flow of material which is conducted down over the passing cups via a chute. By the invention, the material is fed directly to a cup with a kind of rotating spout as the dosing apertures itself follows the cup a distance while dosing is performed. In a preferred variant, the dosing aperture is one of several on a rotating unit which can be characterised as a drum rotating about an axis which is transverse to the direction of movement of the conveyor and thereby of the cups. The drum may advantageously be with more than one dosing aperture; for example there may be two, three, four, five, six or more dosing apertures at the periphery of the drum. The material to be transported is supplied to the interior of the drum via one or more access channels, and one or more kinds of material can be supplied which are mixed by means of the rotatable dispenser, if not before then at the time when the material enters the cup.

By feeding the material into the interior of the drum—at the centre of the rotatable dispenser—there is achieved the great advantage that the material is not accumulated in front of any moving, rotatable part, and therefore is not exposed to being crushed and destroyed. In an apparatus according to the invention there are no narrow slots in which the material can be crushed, to the contrary there is a relatively large distance between the outlet from one or more access channels and to the rotating dispenser with dosing apertures in the periphery.

Between two individual dosing apertures in a rotatable dispenser there is an external periphery—a wall—in the said drum, the wall, or at least part thereof, forming a chute for the material at a dosing aperture and at a subsequent dosing aperture. At each side of a dosing aperture there is thus a chute which more or less extends down into a passing cup during the filling of the latter with material when the rotatable dispenser is rotated concurrently with the conveyor with the cups being moved by.

As mentioned, the chute has the advantage and function that it conducts the material in place in a cup and furthermore acts as a movable/rotating screen covering the area between two cups such that a certain spacing can exist between the cups without any problems. Hereby is achieved the great advantage that there is no need for the hitherto known and problematic overlap between cups in the prior art cup conveyors.

In the Figures which are described below, the function and a preferred way of performing the invention will be discussed in details, and the invention will hereby appear even more clearly.

In a preferred variant of an apparatus and a method according to the invention, the drive means for rotating the rotatable dispenser can include either an electric motor, a pneumatic or a hydraulic motor, wherein the drive means are controlled and/or regulated relative to the cups in the conveyor belt based on input from one or more electric or mechanical sensors and/or switches such that the position of the dosing aperture is in step with the opening of a passing cup. Hereby is achieved that a dosing aperture is always opposite an opening of a cup and not the least that the gap—the above mentioned movable/rotatable screen—always covers the gap existing between two cups in succession. The fact that this gap is covered provides that the cups can do without the known overlap, meaning a simplified and thereby cheaper conveyor by which there are not the same risks of cups not being arranged correctly in relation to each other, and furthermore there is no risk that material is squeezed or crushed between the cups as there is no direct connection between the edges of the cups. A further advantage of using the invention with a rotating dispenser is that less material is wasted due to the much more precise and gentle delivery of material into a cup.

An apparatus according to the invention may advantageously be adapted such that the rotatable dispenser is directly or indirectly mechanically connected with the conveyor belt via one or more gear wheels. There may be a gear wheel disposed at the periphery of the rotating dispenser engaging one of the chains between which all cups in the conveyor are arranged. Such a chain is typically a long-linked steel chain to which the cups are fastened with a journal, a pin or the like such that a given cup is always free to pivot about the pin or similar. There may be one gear wheel, or gear wheels at respective ends of the rotatable dispenser, the gear wheels engaging each their chain. In that way the forces are evenly distributed between the two chains.

Moreover, it is possible to connect the rotatable dispenser mechanically in a more indirect way to one or to both chains on the cup conveyor. It may e.g. be with further gear wheels, with a chain, or alternatively with a toothed belt or other by which it is easy to ensure that the rotatable dispenser is synchronised and in step with the position of the cups.

In a variant of an apparatus according to the invention, the rotatable dispenser can appear drum-like and be suspended by at least two support bearings at one or at either side of the conveyor belt, such that the drum/rotatable dispenser has a rotary axis transversely to the conveyor belt. Hereby is achieved possibility of avoiding bearing structures at the centre of the drum and simultaneously achieve a simple and robust design. The drum can be designed with a kind of groove along the periphery which can be disposed without additional mechanical challenges over the support bearings, which in their simplest form can be constituted by a pair of wheels or roller bearings. A third or maybe a fourth support bearing may be provided in addition according to need, and by using three or more evenly distributed support bearings there is further achieved the advantage that the drum is secured at the desired position and only allowed to rotate in step with the passage of the cups.

However, it is possible to equip an apparatus according to the invention with centrally positioned bearings at least one of the ends of the drum/rotatable dispenser such that at least one side of the conveyor there is provided a bearing and such that the drum/rotatable dispenser is provided a rotary axis transversely to the conveyor.

In a variant of an apparatus according to the invention, the rotatable dispenser includes one or more controllable dampers and one or more access channels, wherein the access channel or channels is/are arranged at the end or ends of the rotatable dispenser. Hereby is achieved the possibility to regulate how much material is to be supplied to the rotatable dispenser. There may be at least one access channel and one or two individually adjustable dampers. There may also e.g. be two access channels and two individually adjustable dampers whereby it is achieved the possibility of feeding two different materials in each their amount to the same rotatable dispenser, wherein a mixing of the two materials then takes place.

In a preferred design of the adjustable dosing device it includes one or more rotatable dampers intended for blocking of one or more passages between an internal chute and a wall part in a closed position and for intended for allowing passage of material when positioned in an adjustable open position. This results in that the average material flow velocity through the drum dispenser is reduced significantly although the drum dispenser handles large amounts of material. Further this construction ensures that the material is evenly distributed in the cups, and that the cups are less likely to move during filling, which is important when the edges of the cups are not provided with any overlaps. Overlaps on prior art cup conveyors may support each cup during spilling, but increases the risk crushing material as already discussed above. Thus there is a reduced risk of spillage during filling of the cups because the material is fed into each cup at a low speed but in relatively large amounts, whereby the cups are quickly filled.

In a particularly preferred embodiment of an apparatus according to the invention, the conveyor belt includes a plurality of juxtaposed cups, wherein between a leading edge of one of the cups and a trailing edge of another cup disposed in front thereof there is a spacing, e.g. a spacing of 5 to 10 mm. A lesser as well as a greater spacing is possible, depending on the respective conditions by the apparatus. As mentioned above, hereby is achieved the advantage that the cups do not need to be controlled such that an edge of one cup lies over an adjacent edge of an adjacent cup, which, among others, means certain mechanical challenges when a cup conveyor changes its direction of movement from horizontal and to vertical or inclined transport and back to horizontal. Furthermore, there is a rather large wear on such overlapping edges which therefore are prone to be worn out or break off, meaning that the entire plant has to be stopped and the defective cup or cups are to be replaced.

A particularly preferred embodiment of an apparatus according to the invention is designed such that the conveyor belt includes at least one drive chain or one drive belt, that the juxtaposed cups are fixed to this drive chain or drive belt, that the rotatable dispenser includes other drive means for direct engagement with the drive chain or drive belt. In this way is achieved the most direct control and synchronisation of the apparatus. There may e.g. be arranged a number of cups on an endless chain why a cup is mounted for every twentieth chain link. A chain wheel directly engaging the chain can be arranged on the rotating dispenser, and a dosing aperture is arranged at every twentieth tooth on the gear wheel. There is thus always an opening in a cup present when a dosing aperture is in position above a such.

In an embodiment of the drum conveyor, the cup conveyor comprises two or more filling stations. This layout allows for dispensing two different materials into the same cup, and may thus dispense different materials into the same cup, e.g for subsequent mixing thereof.

Preferably the cups of the cup conveyor comprise one or more partition walls.

Thereby, each drum dispenser may dispense different materials into different compartments in the cups for transportation of two separate material streams simultaneously, i.e. one in each separate compartment, e.g. after sorting the material into two product streams, such as by sorting by colour or sifting.

Alternatively more than two filling stations may be arranged in relation to the cup conveyor 1 and optionally each cup may comprise more than two compartments separated by partition walls.

In the following, a specific variant of the invention will be discussed with reference to the drawing wherein various Figures show details of the invention.

DESCRIPTION OF THE DRAWING

The invention is described in the following with reference to the drawing, wherein.

In the explanation of the Figures, identical or corresponding elements will be provided with the same designations in different Figures. Therefore, no explanation of all details will be given in connection with each single Figure/embodiment.

DETAILED DESCRIPTION OF EMBODIMENTS OF THE INVENTION

Figure 1:
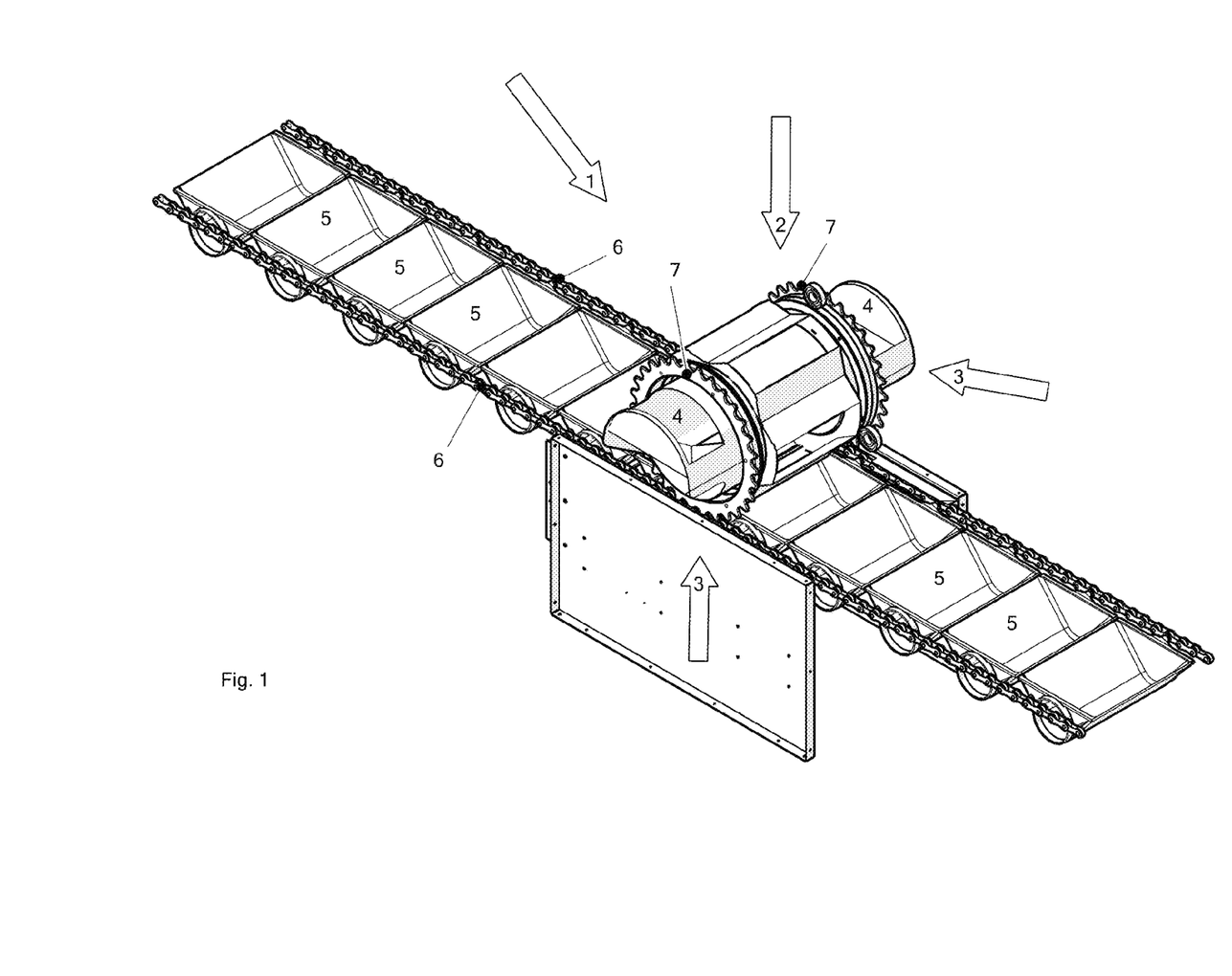
FIG. 1 shows a detail of a cup conveyor with a rotatable dispenser.

FIG. 1 shows a detail of a cup conveyor 1 with a rotatable dispenser 2. At the ends 3 of the rotatable dispenser 2 appear access channels 4 for material to be dosed to the cups 5. The cups 5 are arranged between two long-linked steel chains 6 in such a way that the individual cup is free to pivot about the axis at which it is fixed to the chains 6. The cup conveyor 1 is driven by not shown drive means and the chains are typically guided in rails or on wheels which are not shown on the Figure either. At the ends 3 of the rotatable dispenser 2 are seen two gear wheels 7, each directly engaging a long-linked steel chain 6. This direct mechanical engagement between gear wheels 7 and steel chain 6 entails that the rotatable dispenser 2 is driven concurrently with driving the cup conveyor 1.

Figure 2:
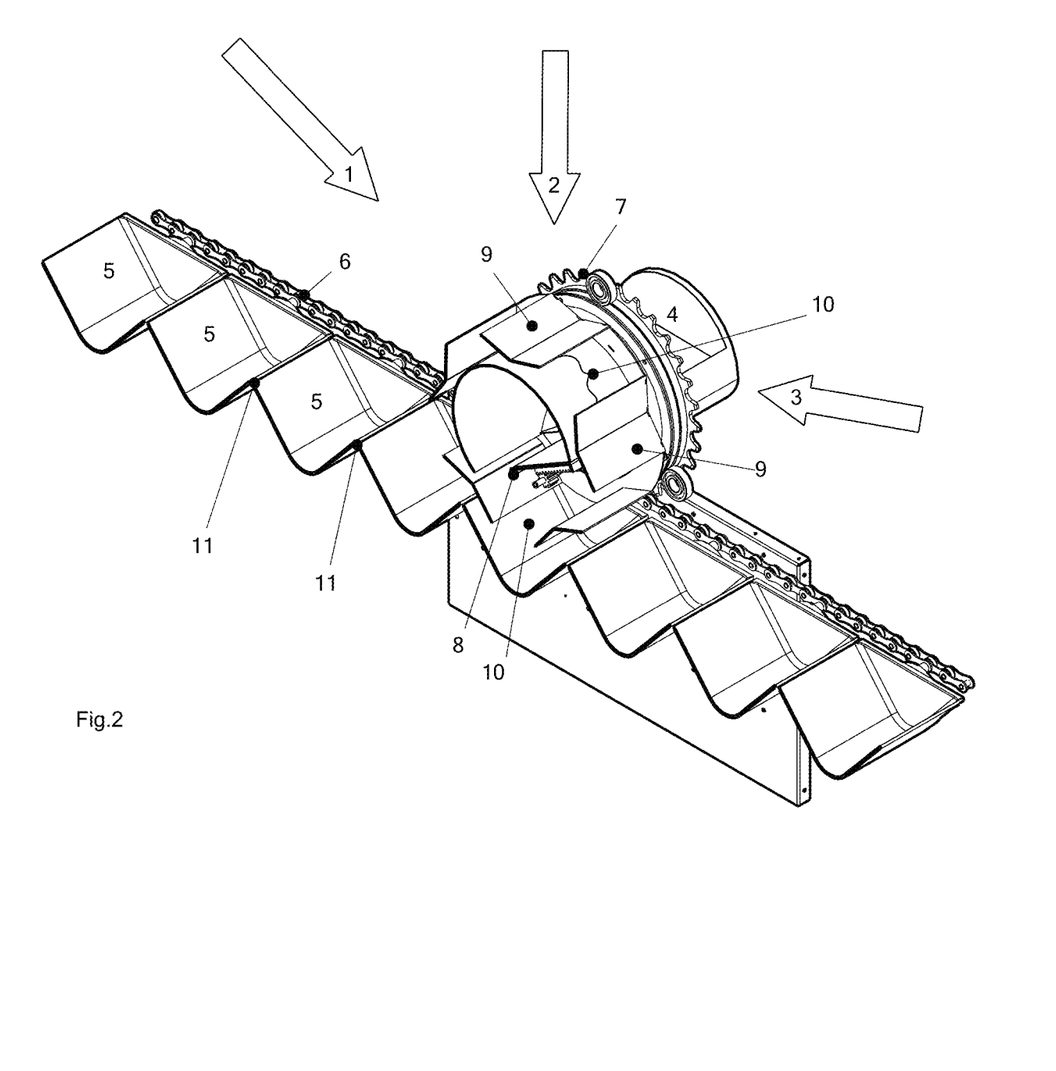
FIG. 2 shows the same as FIG. 1, but in a longitudinal section.

FIG. 2 shows in principle the same as FIG. 1, but here in longitudinal section. The cups 5 as well as the rotatable dispenser 2 are thus seen in section in longitudinal direction of the cup conveyor. In this Figure it is particularly the rotatable dispenser 2 that appears more clearly. Internally of the rotatable dispenser 2 appears here an open damper 8 why the material fed into the access channels 4 flows directly out on the chutes 9 and out through the dosing apertures 10 facing downwards and directed towards a cup 5. In the shown embodiment there are five dosing apertures 10, and between these there are five double chutes 9 in the sense that each chute 9 has one portion which in principle is directed straight or angled towards one dosing aperture 10 at one side and another portion directed or angled towards another dosing aperture 10 at another side in relation to the chute 9. It further appears from the Figure that the gap 11 between two adjacent cups 5 is covered by a chute 9.

Figure 3:
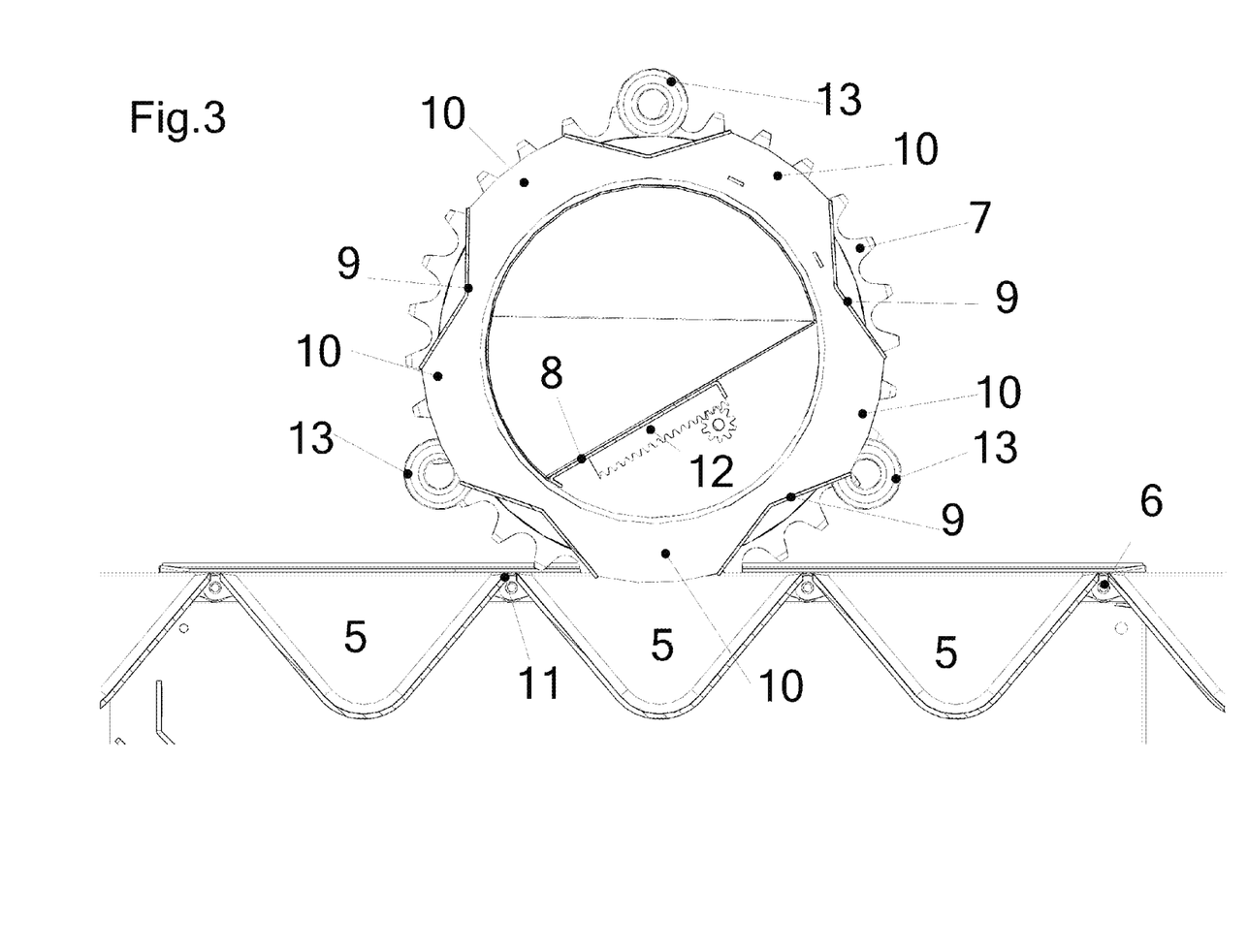
FIG. 3 shows a rotatable dispenser as seen from the side and with closed damper.
Figure 4:
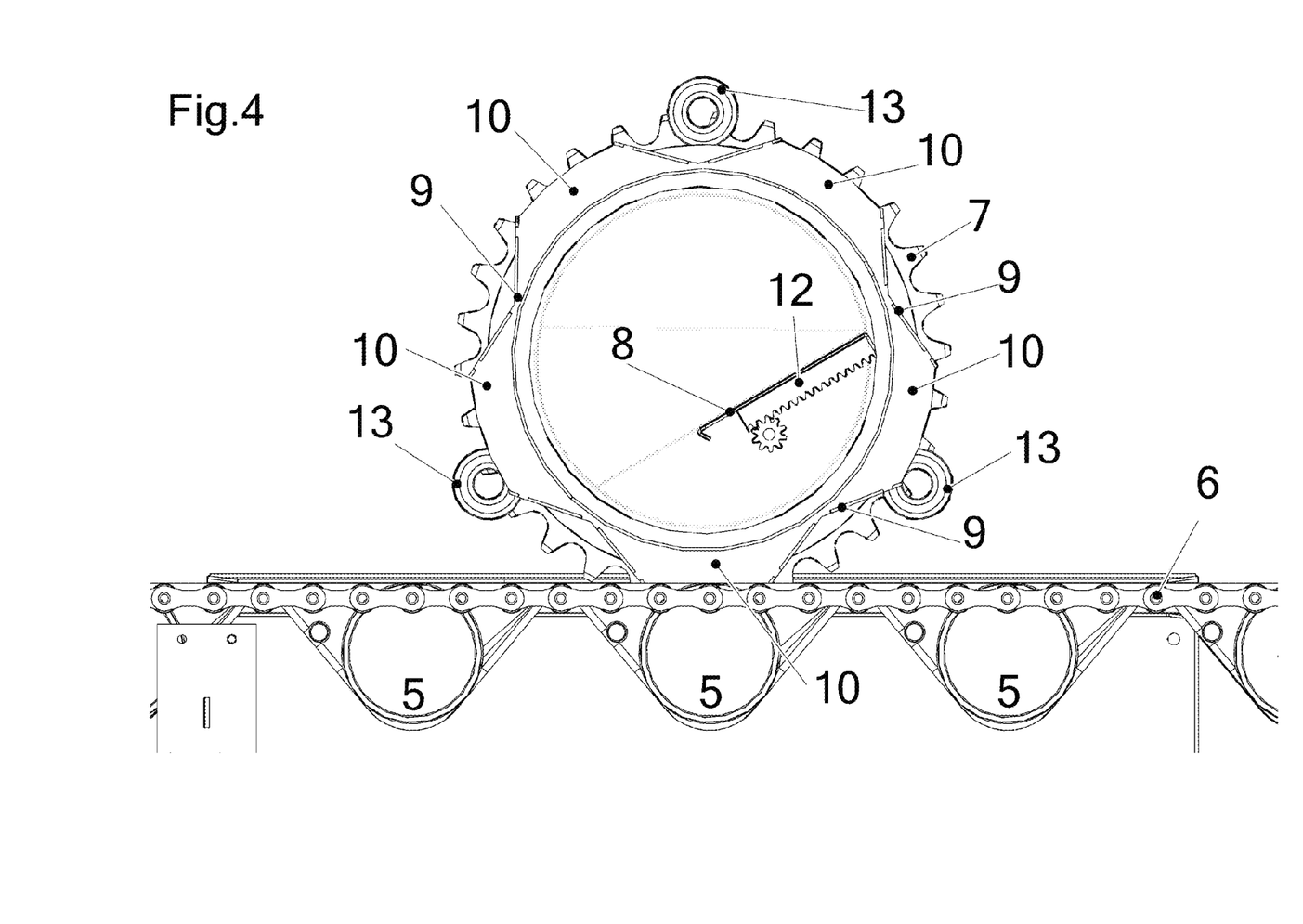
FIG. 4 shows a rotatable dispenser as seen from the side and with open damper.

FIGS. 3 and 4 show a rotatable dispenser 2 as seen from the side and with closed and open damper 8, respectively. The damper 8 is opened and closed here with a rack means 12 but may readily be operated by other suitable mechanisms, e.g. as indicated below. However, the rack 12 provides the very clear advantage over e.g. a pneumatic actuator in that a very controlled regulation of the damper 8 and thereby of the dosed amount of material can be effected. In the shown position of the rotatable dispenser 2, which is a snapshot, is a dosing aperture 10 directed straight towards the centre of a cup 5. At the periphery of the rotatable dispenser 2 appears two support bearings 13 immediately over the chain 6, and yet a support bearing 13 is seen at the top of the rotatable dispenser 2. The rotatable dispenser 2 rests on and is fixed by these support bearings 13 which in principle can be constituted by wheels or roller bearings of suitable type.

Figure 5:
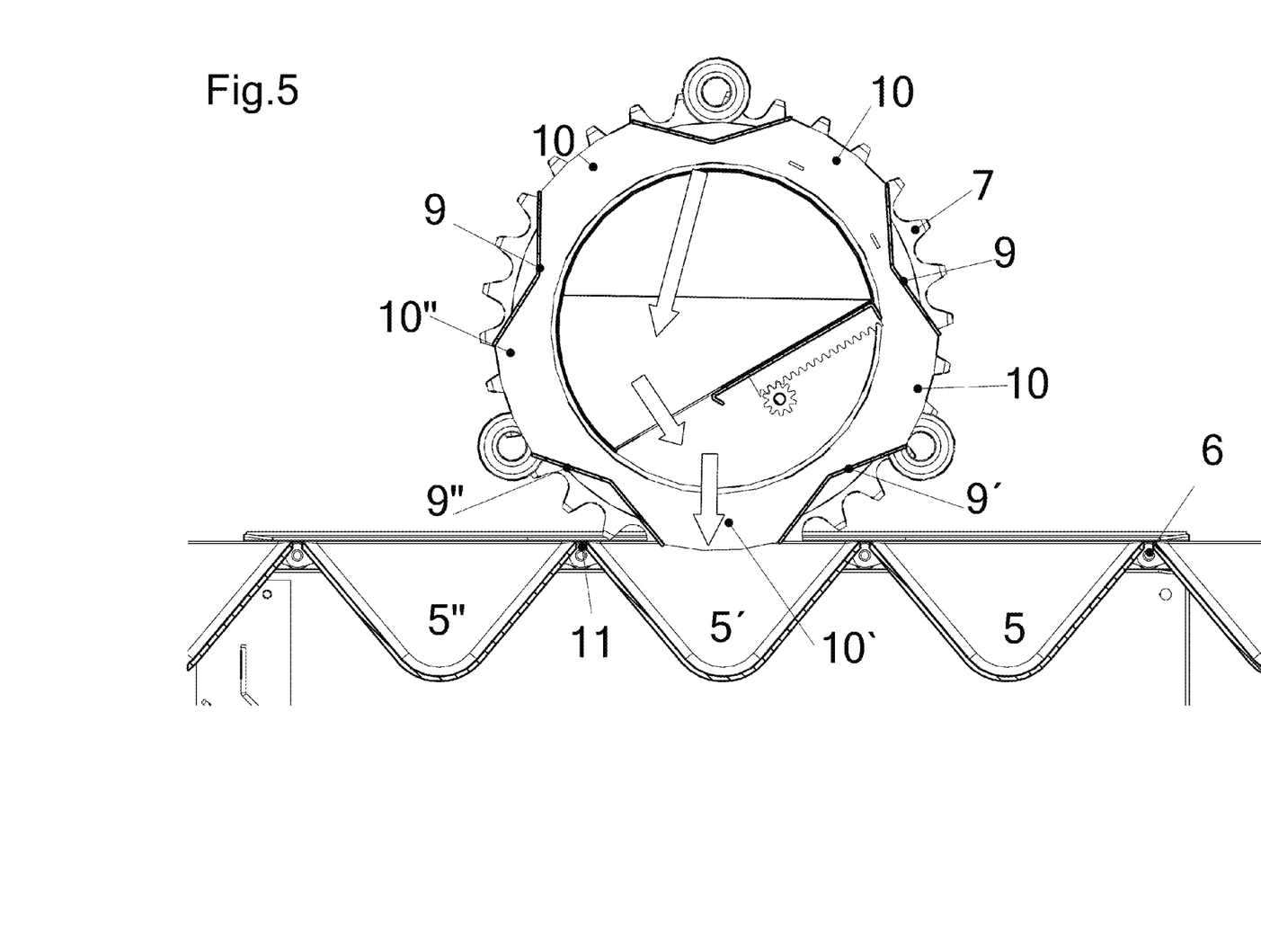
FIG. 5 shows material flow at a first position in a rotatable dispenser.

FIGS. 5 to 8 show various snapshots of how material flows internally in the rotatable dispenser 2 while it is rotating counter clockwise as the cup conveyor 1 is moving to the right. FIG. 5 shows how a rotatable dispenser 2 as seen from the side and with open damper 8, with arrows showing how material flows in through the not shown one or more access channels 4, through the damper 8 and out between two chutes 9' and 9", through a dosing aperture 10' and down into the cup 5'. The chute 9" in this Figure is on its way to cover the gap 11 between two cups 5' and 5".

Figure 6:
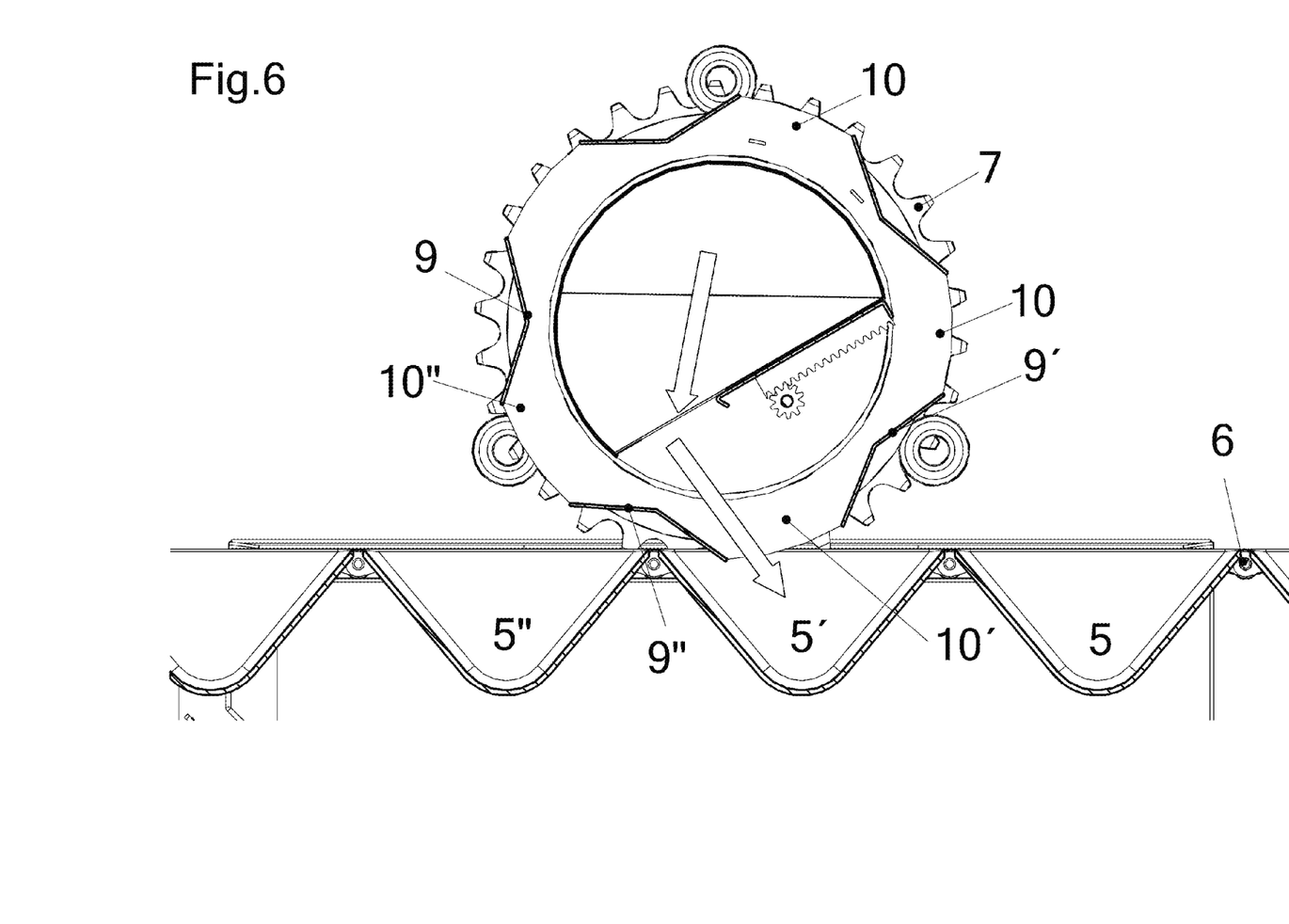
FIG. 6 shows material flow at a second position in a rotatable dispenser.

In FIG. 6 the cups 5 have moved to the right and the dosing aperture 10' has moved upwards whereby the chute 9" has come to cover even more of the gap 11 between the two cups 5' and 5", and the material still flows out of one dosing aperture 10'.

Figure 7:
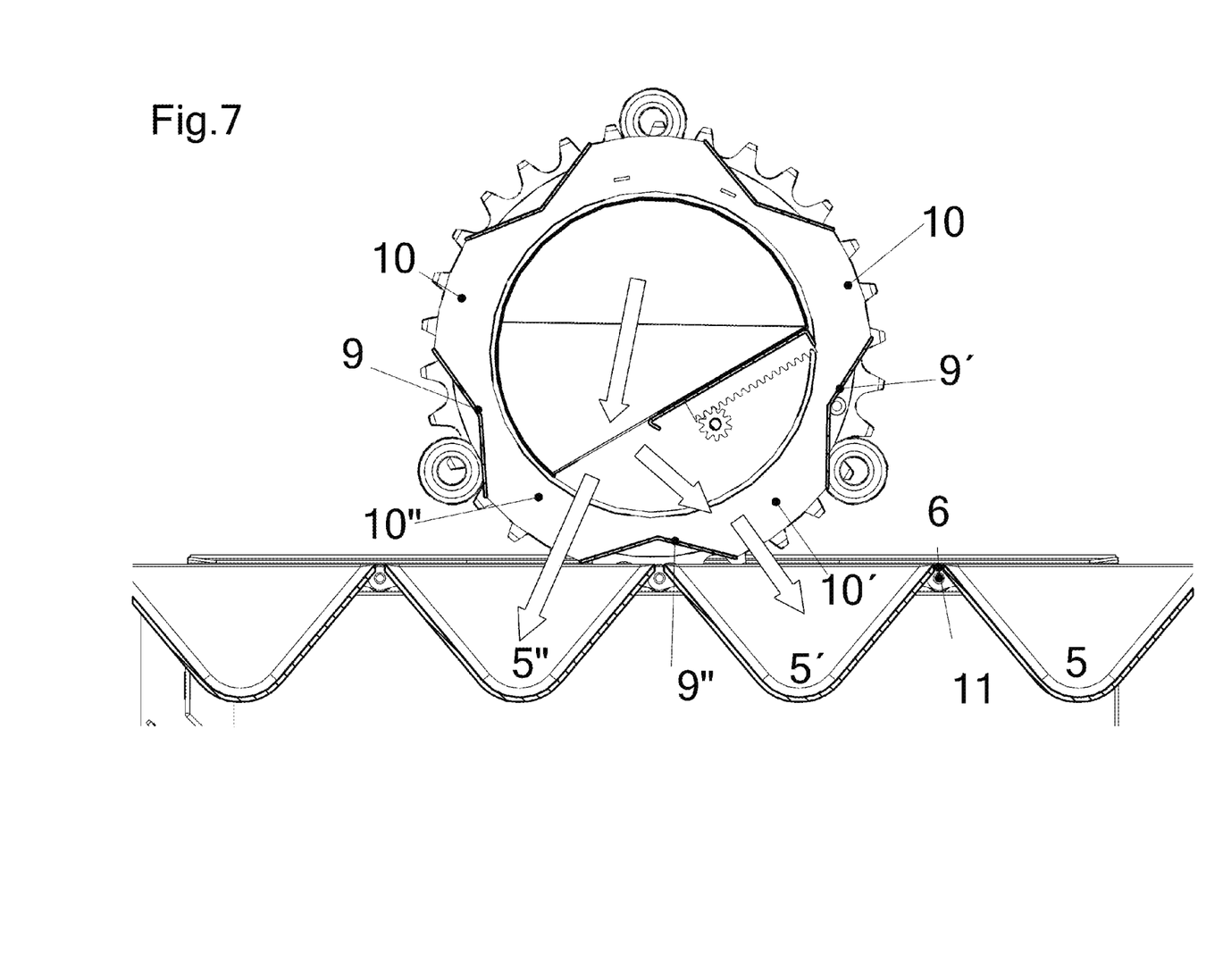
FIG. 7 shows material flow at a third position in a rotatable dispenser.

FIG. 7 shows material flow in a third position in the rotatable dispenser 2 wherein the cups 5 are moved even more to the right, and wherein the rotatable dispenser is rotated even more counter clockwise, where the material now flows out of two dosing apertures 10' and 10" and down into two cups 5' and 5" while at the same time the chute 9" is in position over the gap 11 and simultaneously guides material on right course down into cups 5' and 5".

Figure 8:
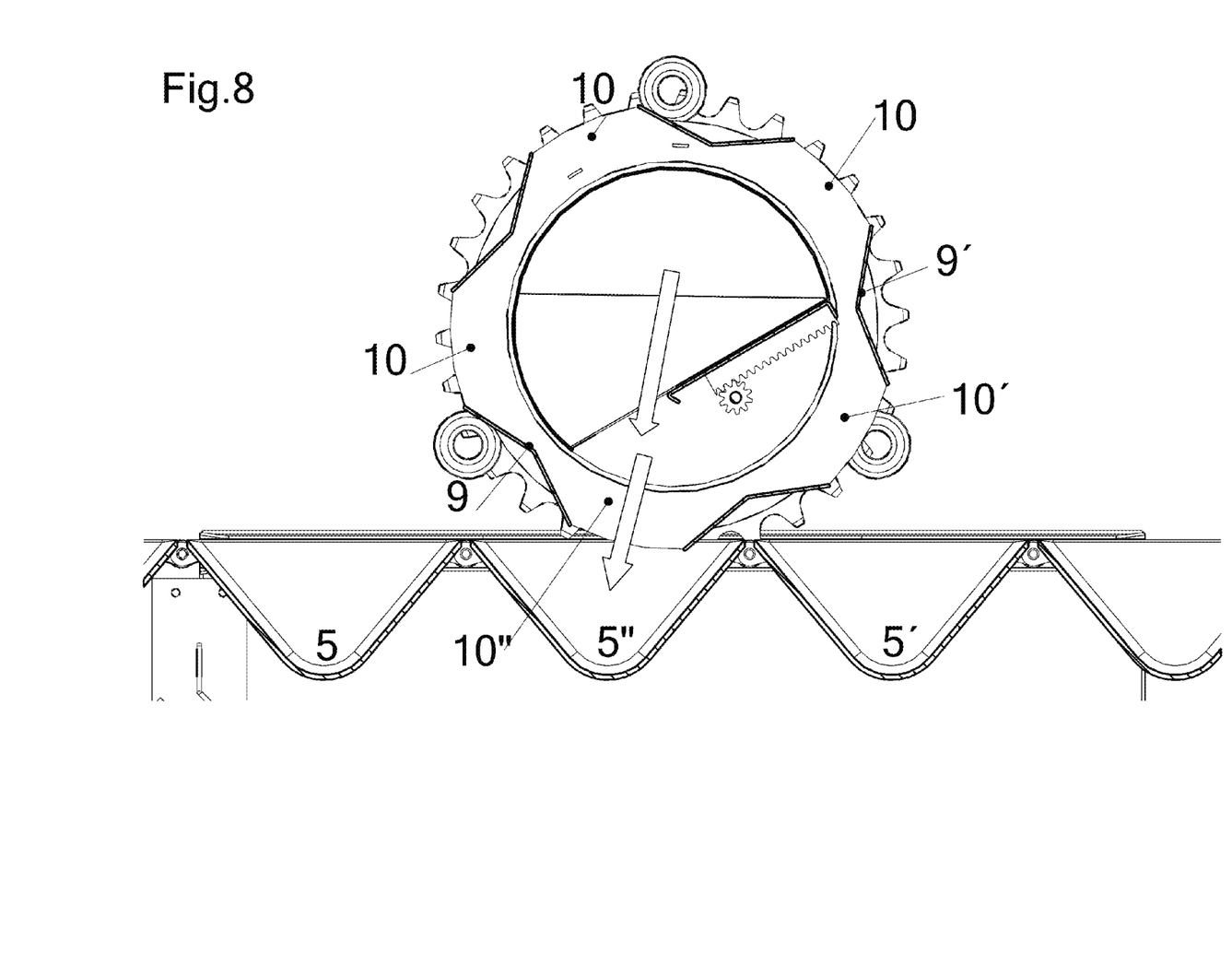
FIG. 8 shows material flow at a fourth position in a rotatable dispenser.

In FIG. 8 is shown a fourth position in a rotatable dispenser 2 where cups 5 as well as the rotatable dispenser 2 have moved further, and where it is now the subsequent dosing aperture 10" that doses material into the succeeding cup 5".

Figure 9:
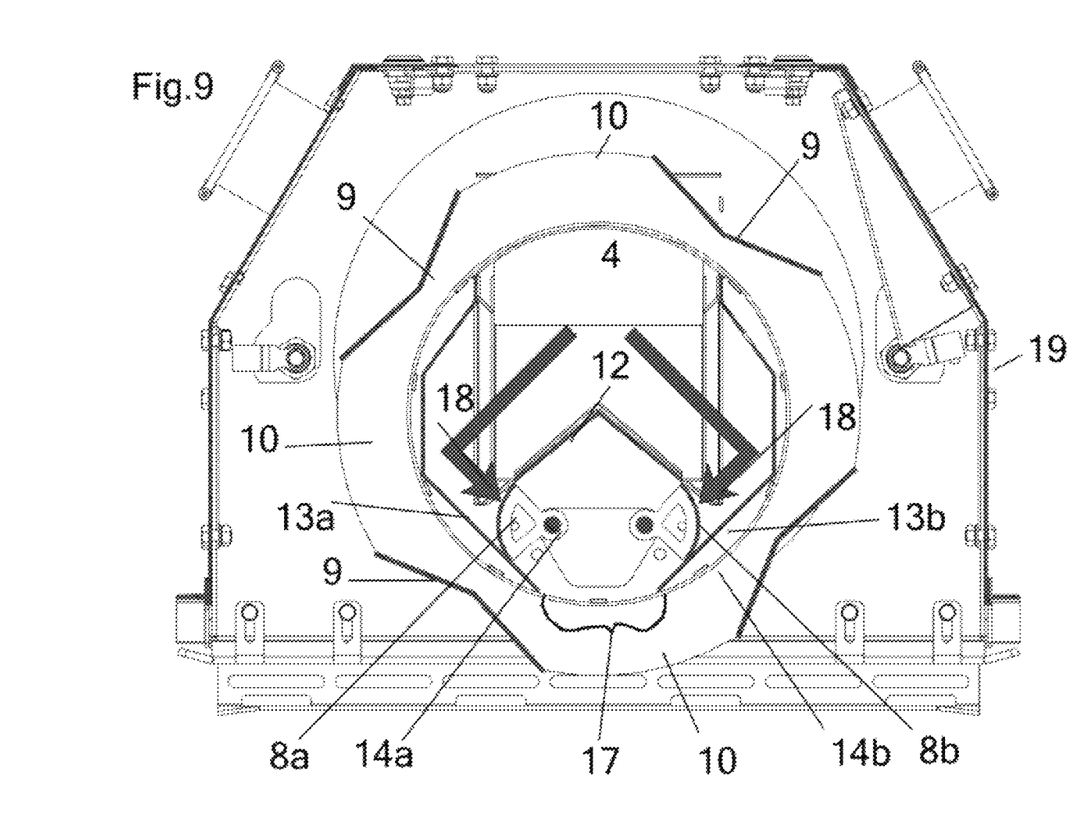
FIG. 9 shows material flow blocked by an alternative adjustable damper in a second embodiment of the rotatable dispenser.
Figure 10:
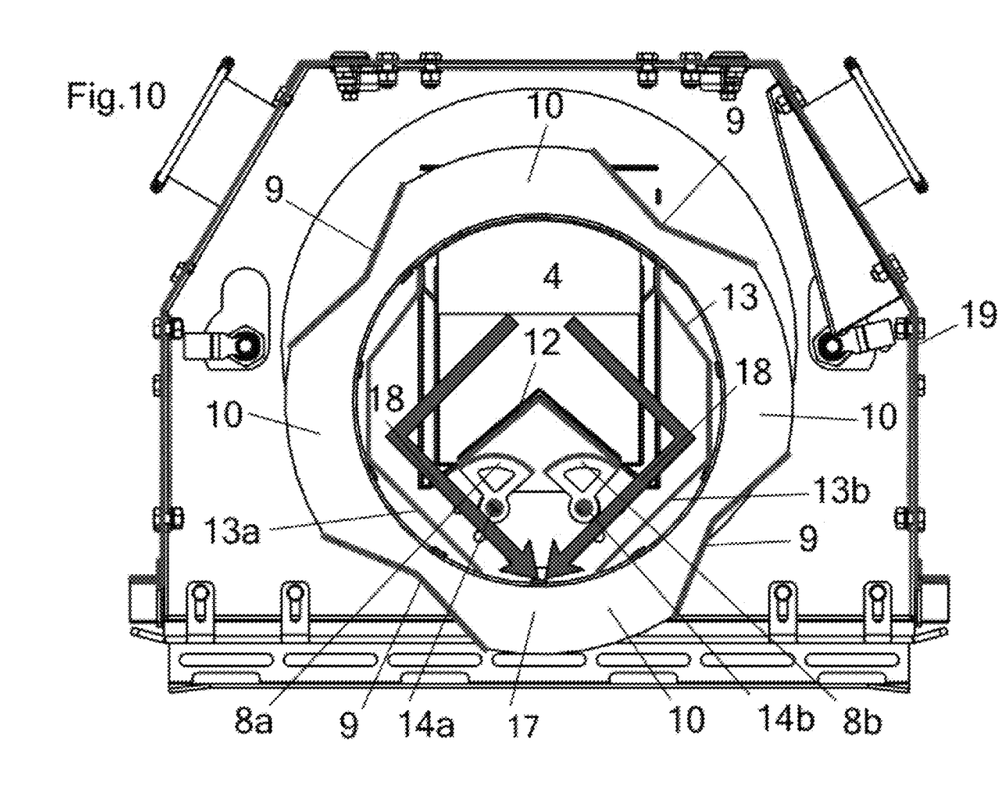
FIG. 10 shows material flow through the alternative adjustable damper in a second embodiment of the rotatable dispenser.

FIG. 9-10 illustrates an alternative construction of the interior passage of the filling station 2 with closed and open dosing device, i.e. similar to FIGS. 3-4. The internal of the drum dispenser comprises an inner stationary part enclosed by an inner wall 13 and further comprises an interior double chute 12 arranged in axial direction of the rotary drum dispenser, and thus across the cup conveyor 1 below. The adjustable dosing device 8 comprises two rotatable dampers 8a, 8b. The rotatable dampers 8a, 8b comprise a shield 14a, 14b formed as a part, e.g. between one fourth to one half, of a cylindrical wall 8a, 8b which are mounted on rotatable shafts 14a, 14b. Cogwheels 15 are mounted on the end of the shafts and the cogwheels 15 are connected to an actuator 16 for rotating the dampers in either direction for opening or closing of the rotary dampers 8a, 8b. A lower part 13a, 13b of the inner wall 13 on each side of the drum dispenser extends obliquely downwards and forms a second and third chute 13a, 13b. Thus a passage 18 is formed between the interior double chute 12 and each of the second and third inner wall chutes 13a, 13b respectively. Between the lower edge of the second and third chute 13a, 13b there is a bottom aperture 17. The bottom aperture 17 is preferably arranged below the interior double chute 12.

Between the interior double chute 12 and each of the interior wall parts 13a, 13b there is a passage 18, which allows material to pass from the interior of the drum dispenser 2, through the bottom aperture 17, from which it passes the rotary drum with double chutes 9 and dosing apertures 10 and into the cups 5 as discussed above and as shown in FIGS. 5-8.

The rotary shafts 14a, 14b are preferably mounted below the double chute 12. Thereby the double chute forms a shield against particulate Each of the rotary dampers 8a, 8b are mounted in order to be able to block the passage 18 between the double chute 12 and the second and third inner wall chutes 13a, 13b respectively. This is illustrated by the arrows in FIG. 9 where the rotary dampers 8a, 8b are in the closed position. The rotary dampers 8a, 8b are adjustable between the fully open and the fully closed position for adjusting and controlling the flow of material through the drum dispenser 2. Thus, the flow of material can be effectively controlled by varying the position of the rotatable dampers 8a, 8b, so that a larger or smaller passage is formed between the edge of the shield of the rotating dampers 8a, 8b and the second or third chutes 13a, 13b respectively.

In FIG. 10 the rotary dampers 8a, 8b are shown in their fully open position. Material enters the internal of the dispenser from one or more feeding channels 4 and flows over the double chute 12.

Alternatively, the damper 8 shown in FIGS. 3-4 is substituted with an oblique chute positioned as the open damper shown in FIG. 4, and a single rotary damper as discussed above is provided to block the passage between the inner wall part and the chute.

The cup conveyor 1, the mounting of the filling station in relation to the cup conveyor, the rotatable dispenser with apertures 10 and the double chutes 9, etc. are essentially as discussed above and will not be discussed in detail in relation to these embodiments. Preferably, the drum dispenser 2 comprises one gear wheel 7 at one end of the drum dispenser 2 for engaging with the chain 6 of the cup conveyor 1.

By a cup conveyor 1 in which is used a rotatable dispenser 2 as indicated here, a cup 5 can be filled in very few seconds, and the next cup 5 and numerous other cups 5 as well can be filled in the same rapid way. It is thus possible to ensure exact disposition of material in a cup 5 simultaneously with spillage being reduced, and maybe most important there is no longer need for an overlap between adjacent cups 5. By adapting the rotatable dispenser 2 such that it is rotated in step with the passing of the cups 5, the chutes 9 can actually be extended such that they extend right down into the cup 5, which in some cases can be advantageous with certain materials. This results in that the average material flow velocity through the drum dispenser is reduced significantly although the drum dispenser handles large amounts of material. Further this construction ensures that the material is evenly distributed in the cups, and that the cups are less likely to move during filling, which is important when the edges of the cups are not provided with any overlaps. Overlaps on prior art cup conveyors may support each cup during spilling, but increases the risk crushing material as already discussed above. Thus there is a reduced risk of spillage during filling of the cups because the material is fed into each cup at a low speed but in relatively large amounts, whereby the cups are quickly filled. In particular, the embodiment of the drum dispenser shown in FIGS. 9-10 handles material at low flow velocity of material through the drum dispenser 2. This enables filling and transporting of sensitive materials which are easily crushed, resulting in creation of dust, or abrasive particulate material, which will otherwise cause extensive wear in prior art drum dispensers, and at reduced risk of creating any dust.

Figures 11A, 11B:
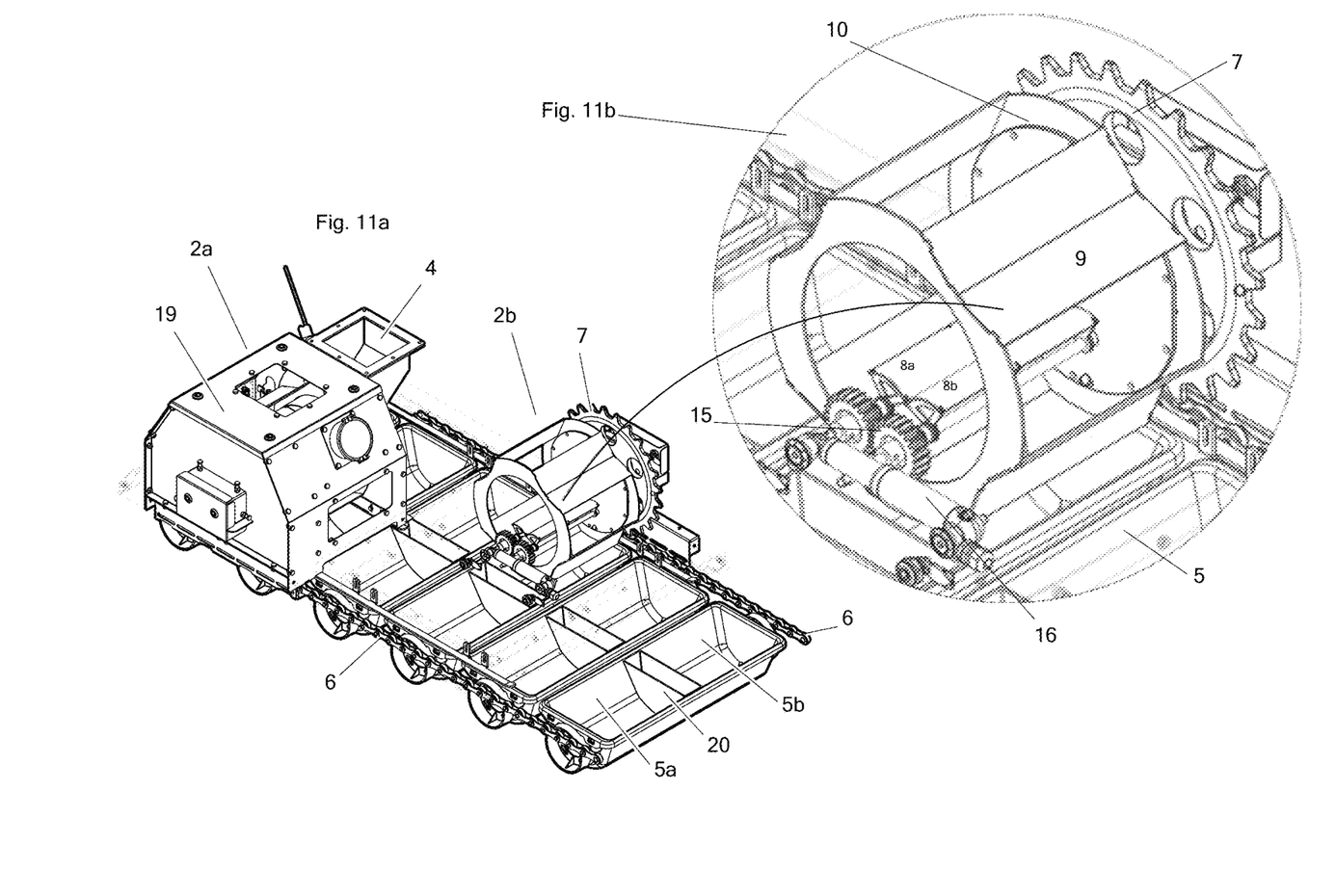
FIG. 11a shows a detail of an alternative cup conveyor with a dual rotatable dispenser arrangement.
FIG. 11b illustrates the position of the rotatable dampers in relation to the rotary drum with drive means, chutes 9 and dosing apertures and in relation to the cup conveyor.

FIG. 11a illustrates an alternative version of the cup conveyor 1 in which two, filling stations 2a, 2b are positioned above the cup conveyor 1. The cups 5 may be as discussed above or alternatively each cup is divided into two or more separate compartments 5a, 5b by one or more partition walls 20. The drum dispensers 2a, 2b may be of either type discussed above. This layout allows for dispensing two different materials into the same cup, and may thus dispense different materials into the same cup, e.g for subsequent mixing thereof. Alternatively each drum dispenser may dispense different materials into different compartments in the cups for transportation of two separate material streams simultaneously, i.e. one in each separate compartment, e.g. after sorting the material into two product streams, such as by sorting by colour or sifting. Preferably each drum dispenser comprises one gear wheel 7 as drive means engaging with each of the chains 6 of the cup conveyor 5 as discussed above. Thus the gear wheel drives the first dispenser 2a.

Alternatively more than two filling stations 2 may be arranged in relation to the cup conveyor 1 and optionally each cup may comprise more than two compartments separated by partition walls.

FIG. 11b illustrates the position of the rotatable dampers 8a, 8b in relation to the rotary drum with drive means 7, chutes 9 and dosing apertures 10 and in relation to the cup conveyor 1.

The invention claimed is:

1. A cup conveyor including an apparatus for filling cups in the cup conveyor, wherein the cups are interconnected and arranged juxtaposed and thus constitute an endless conveyor belt, wherein a cup at least includes an upwardly facing opening, two opposing end faces and one or more bottom faces and/or side faces, wherein in the direction of movement of the conveyor belt along the extension of the cup the opening has a leading edge and a trailing edge extending transversely to the direction of movement of the conveyor belt, which is typically substantially horizontal during filling of the cups, wherein the apparatus further includes a filling station with an adjustable dosing device from which the material is supplied to the cups via a chute system during their passage of the filling station, wherein the filling station of the apparatus includes a rotatable dispenser arranged above the cups, that means for supplying materials are arranged at the centre of the rotatable dispenser, that the rotatable dispenser includes a rotary drum comprising one or more dosing apertures for dosing material from an interior of the rotatable dispenser into a cup and a chute at each side of the one or more dosing apertures, and where the wall of the drum, or at least a part thereof forms a chute for the material between a dosing aperture and a subsequent dosing aperture, which chutes extends more or less down into a passing cup, that the apparatus further includes drive means and means for controlling and regulating the at least one dosing aperture and the chutes in the rotatable dispenser in relation to the positions of the openings in adjacent cups and a trailing edge and a leading edge of two adjacent cups at the filling station so that the chutes covers the gap existing between two cups in succession when the apparatus is in operation, wherein the rotatable dispenser includes one or more controllable dampers and one or more access channels, and wherein the access channel or channels is/are arranged at an end or ends of the rotatable dispenser.

2. Cup conveyor according to claim 1, wherein the drive means for rotating the rotatable dispenser include either an electric motor, a pneumatic or a hydraulic motor, wherein the drive means are controlled and/or regulated relative to the cups in the conveyor belt based on input from one or more electric or mechanical sensors and/or switches.

3. Cup conveyor according to claim 1, wherein the rotatable dispenser is directly or indirectly mechanically connected with the conveyor belt via one or more gear wheels.

4. Cup conveyor according to claim 1, wherein the rotatable dispenser appears drum-like and is suspended by at least two support bearings at one or at either side of the conveyor belt, and thus having a rotary axis transversely to the conveyor belt.

5. Cup conveyor according to claim 1, wherein the rotatable dispenser appear drum-like and is suspended centrally at at least one of its ends at at least one side of the conveyor belt, and thus having a rotary axis transversely to the conveyor belt.

6. Cup conveyor according to claim 1, wherein the adjustable dosing device includes one or more rotatable dampers intended for blocking of one or more passages between an internal chute and a wall part in a closed position and for intended for allowing passage of material when positioned in an adjustable open position.

7. Cup conveyor according to claim 1, wherein the conveyor belt includes a plurality of juxtaposed cups, that between a leading edge of one of the cups and a trailing edge of another cup disposed in front thereof there is a spacing.

8. Cup conveyor according to claim 7, wherein the spacing is about 5 to 10 mm.

9. Cup conveyor according to claim 1, wherein the conveyor belt includes at least one drive chain or one drive belt, that the juxtaposed cups are fixed to this drive chain or drive belt, that the rotatable dispenser includes other drive means for direct engagement with the drive chain or drive belt.

10. Cup conveyor according to claim 1, wherein the cup conveyor comprises two or more filling stations.

11. Cup conveyor according to claim 1, wherein the cups of the cup conveyor comprise one or more partition walls.

12. A method for using a cup conveyor comprising an apparatus for filling cups in the cup conveyor according to claim 1, wherein the method includes filling cups of a cup conveyor, wherein a conveyor belt moves in a direction of movement at a given speed, wherein a dosing device at a filling station doses a matching flow of material, wherein the method includes at least the following steps:

cups connected with a conveyor belt are moved past a dosing device with at least one rotatable dispenser with one or more dosing apertures;

the at least one rotatable dispenser is rotated concurrently with the position of the cups and so that the dosing aperture or each of the apertures of the rotatable dispenser is always opposite an opening of a cup, and such that a leading edge of one cup and the trailing edge of a different, adjacent cup are covered by the chute system of the dosing device;

material is dosed from one or more access channels arranged at an end or ends of the rotatable dispenser, through the interior of the rotatable dispenser and via a specific dosing aperture and thereby supplied to a cup at a specific position and flowing the material at low velocity by reducing the flow velocity of the material inside the rotatable dispenser by the one or more controllable dampers.

13. Method according to claim 12, wherein the rotatable dispenser of the dosing device is driven electrically, pneumatically or hydraulically based on input from one or more electric and/or mechanical sensors and/or switches such that the position of a dosing aperture is in step with the opening of a passing cup.

14. Method according to claim 13, wherein the rotatable dispenser of the dosing device is driven mechanically via a direct or indirect mechanical connection to the conveyor belt such that the position of a dosing aperture is in step with the opening of a passing cup.

* * * * *